(12) United States Patent
Sun et al.

(10) Patent No.: US 11,628,910 B1
(45) Date of Patent: Apr. 18, 2023

(54) STRING-TYPE MOORING SYSTEM

(71) Applicant: DALIAN UNIVERSITY OF TECHNOLOGY, Liaoning (CN)

(72) Inventors: Lei Sun, Dalian (CN); Chong Fu, Dalian (CN); Zhe Lin, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 441 days.

(21) Appl. No.: 17/043,790

(22) PCT Filed: Mar. 17, 2020

(86) PCT No.: PCT/CN2020/079600
§ 371 (c)(1),
(2) Date: Sep. 30, 2020

(87) PCT Pub. No.: WO2021/017483
PCT Pub. Date: Feb. 4, 2021

(30) Foreign Application Priority Data

Jul. 29, 2019 (CN) .......................... 201910687095.1
Jul. 29, 2019 (CN) .......................... 201921199360.3

(51) Int. Cl.
*B63B 21/20* (2006.01)
*B63B 21/04* (2006.01)
*B63B 21/00* (2006.01)

(52) U.S. Cl.
CPC .............. *B63B 21/20* (2013.01); *B63B 21/04* (2013.01); *B63B 2021/005* (2013.01); *B63B 2021/203* (2013.01)

(58) Field of Classification Search
CPC ... B63B 21/20; B63B 21/04; B63B 2021/005; B63B 2021/203
USPC ............ 114/230.15, 230.21, 230.22, 230.23, 114/230.24, 230.25, 230.26, 230.27
See application file for complete search history.

(56) References Cited

FOREIGN PATENT DOCUMENTS

CN           109878635 A   *   6/2019

* cited by examiner

*Primary Examiner* — Anthony D Wiest
(74) *Attorney, Agent, or Firm* — McCarter & English, LLP; Yu Lu

(57) ABSTRACT

The present invention provides a string-type mooring system. A support frame is provided on a dock. Two free guide rollers are provided at vertical corresponding positions that are respectively below a cross arm of the support frame and above the dock. The two free guide rollers are respectively wound with a cable. One end of each cable is connected to a platform arm fixed on a platform, and the other end thereof is horizontally connected with one end of a spring. The other ends of the two springs are respectively connected with a hydraulic device. The present invention provides an omnidirectional restoring force for the moored platform through the elastic deformation of the springs to control the movement response of the platform within a certain range. The present invention can adjust the slow change of the vertical position of the platform caused by tidal fluctuation.

7 Claims, 3 Drawing Sheets

STRING-TYPE MOORING SYSTEM

CROSS-REFERENCE TO RELATED APPLICATIONS

This application is a U.S. national stage filing, under 35 U.S.C. § 371(c), of International Application No. PCT/CN2020/079600, filed on Mar. 17, 2020, which claims priority to Chinese Patent Application No. 201910687095.1, filed on Jul. 29, 2019, and Chinese Patent Application No. 201921199360.3, filed on Jul. 29, 2019. The entire contents of each of the aforementioned applications are incorporated herein by reference.

TECHNICAL FIELD

The present invention relates to the technical field of mooring.

BACKGROUND

Mooring refers to the process of using mooring equipment to make a vessel, buoy, platform, etc. safely stay on an anchor, shore or mooring pontoon. The mooring system includes a dock, trestle berth, dolphin, mooring pontoon and another vessel to moor to. The bow is generally moored against the tide in ports with dominant tides and against the wind in ports where the wind scale goes to a force of over 4.

The traditional mooring device directly ties the vessel and platform, etc. to the dock or other equipment through cables. In case of tidal fluctuation or severe conditions like strong winds and waves, it is difficult to maintain the stability of the vessel or platform, especially a platform requiring high stability, for example, a nuclear reactor platform.

SUMMARY

In order to ensure the stability of the mooring of vessels, platforms and other equipment, the present invention provides a string-type mooring system.

In order to achieve the above objective, the present invention adopts the following technical solution: a string-type mooring system, where a support frame 8 is provided on a dock 12; two free guide rollers 3 are provided at vertical corresponding positions that are respectively below a cross arm of the support frame 8 and above the dock 12; the two free guide rollers 3 are respectively wound with a cable 9; one end of each cable 9 is connected to a platform arm 11 fixed on a platform 1, and the other end thereof is horizontally connected with one end of a spring 13; the other end of the spring 13 is connected with a hydraulic device 6.

The two springs 13 are respectively provided in a spring sleeve 5; the two (upper and lower) spring sleeves 5 and the two (upper and lower) hydraulic devices 6 are respectively provided on a lower side of the cross arm of the support frame 8 and on the dock 12 through a support base 7.

Two anti-collision fairlead bases 4 are provided in correspondence in a vertical direction of the cables 9 below the cross arm of the support arm 8 and above the dock 12; the anti-collision fairlead bases 4 are respectively composed of legs 4-3 and a base surface 4-2; lower ends of the legs 4-3 are fixed on the lower side of the cross arm of the support frame 8 or on the dock 12; the base surface 4-2 is provided on the top of the legs 4-3; a center of the base surface 4-2 is provided with a limiting hole 4-1 for the cable 9 to penetrate through; an upper surface of the base surface 4-2 is made of an elastic material.

Roller supports 3-3 of the free guide rollers 3 are respectively provided on the lower side of the cross arm of the support arm 8 and on the dock 12; a roller is provided on an upper part of the roller support 3-3; a roller groove 3-1 is provided on a central circumference of the roller, and an anti-jumping baffle 3-2 is provided on the upper part of the roller support 3-3 on an outer side of the roller; a groove corresponding to the roller groove 3-1 is provided on an inner side of the anti jumping baffle 3-2

The cables 9 are fixedly connected with the platform arm 11 through a connection joint 10; the connection joint 10 is provided with a U-shaped groove; connecting holes 10-1 are provided on both sides of the U-shaped groove, and holes corresponding to the connecting holes 10-1 are provided on the platform arm 11; the connection joint 10 is fixedly provided by penetrating a connecting rod through the platform arm holes and the connecting holes 10-1.

Fenders 2 are provided between a side of the dock 12 and the platform 1.

The hydraulic devices 6 are mechanical self-locking hydraulic devices.

The string-type mooring system of the present invention provides an omnidirectional restoring force for the moored platform through the elastic deformation of the springs to control the movement response of the platform within a certain range. The mooring system can adjust its vertical equilibrium position accordingly to adapt to the change in the vertical equilibrium position of the platform caused by tidal fluctuation, and untie the moored platform safely and quickly as required in extreme cases.

REFERENCE NUMERALS

1. platform; 2. fender; 3. free guide roller; 3-1. roller groove; 3-2. anti jumping baffle; 3-3. roller support; 4. anti-collision fairlead base; 4-1. limiting hole; 4-2. base surface; 4-3. leg; 5. spring sleeve; 6. hydraulic device; 7. support base; 8. support frame; 9. cable; 10. connection joint; 10-1. connecting hole; 10-2. groove; 11. platform arm; 12. dock; and 13. spring.

DETAILED DESCRIPTION

Figure 1:
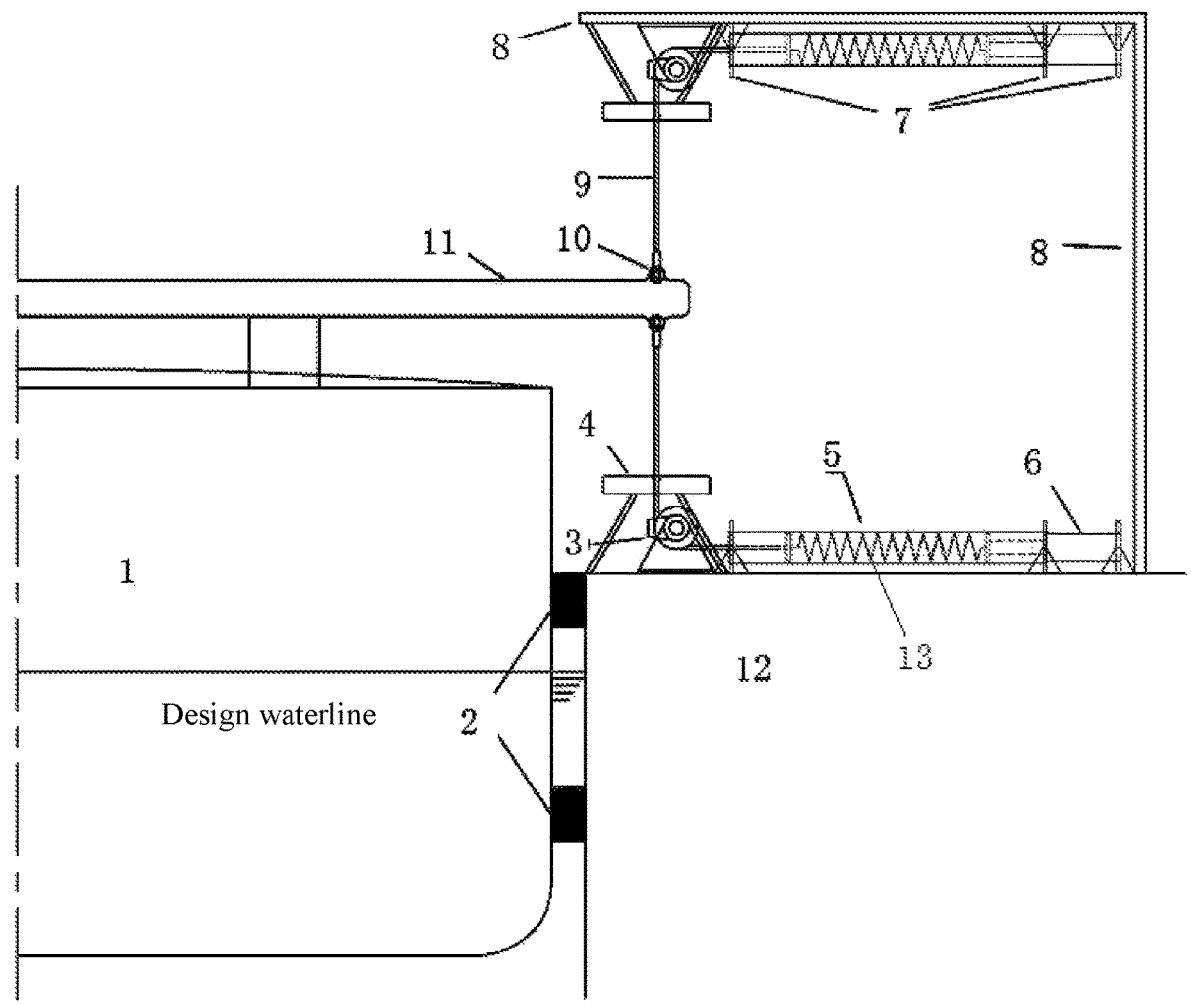
FIG. 1 is a front view of a string-type mooring system according to the present invention.

The present invention provides a string-type mooring system. As shown in FIG. 1, a support frame 8 is provided on a dock 12. Two free guide rollers 3 are provided at vertical corresponding positions that are respectively below a cross arm of the support frame 8 and above the dock 12. The two free guide rollers 3 are respectively wound with a cable 9. One end of each of the two cables 9 is connected to a platform arm 11 fixed on a platform 1, that is, one end of each of the two cables 9 is connected to the platform arm 11 through a connection joint 10, and the other end thereof is connected with one end of a spring 13. The other ends of the two springs 13 are respectively connected with a hydraulic device 6. The two springs 13 are respectively provided in a spring sleeve 5. The two (upper and lower) spring sleeves 5 and the two (upper and lower) hydraulic devices 6 are respectively provided on a lower side of the cross arm of the support frame 8 and on the dock 12 through a support base 7. Fenders 2 are provided between a side of the dock 12 and the platform 1.

Figure 2:
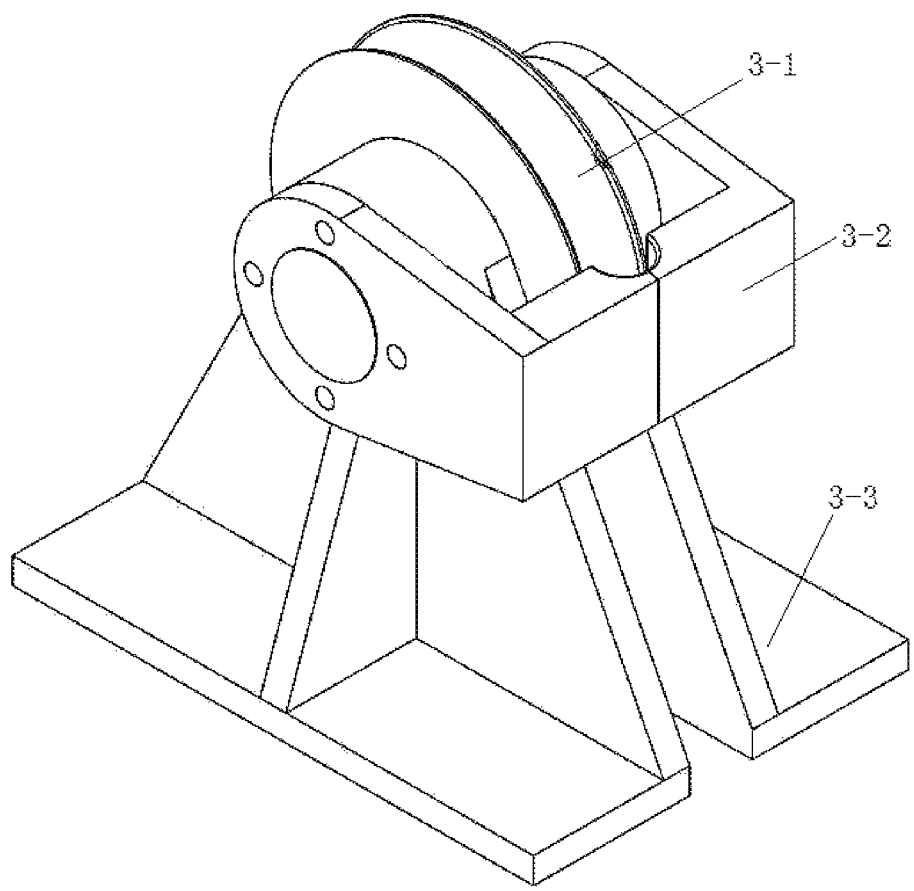
FIG. 2 is a structural view of a free guide roller of the string-type mooring system according to the present invention.

As shown in FIG. 2, roller supports 3-3 of the free guide rollers 3 are respectively provided on the lower side of the cross arm of the support frame 8 and on the dock 12. A roller is provided on an upper part of the roller support 3-3, and a roller groove 3-1 is provided on the roller for winding the cable. An anti jumping baffle 3-2 is provided on the upper part of the roller support 3-3 on an outer side of the roller. A groove corresponding to the roller groove 3-1 is provided on an inner side of the anti jumping baffle 3-2 to prevent the cable from leaving the roller groove.

Figure 3:
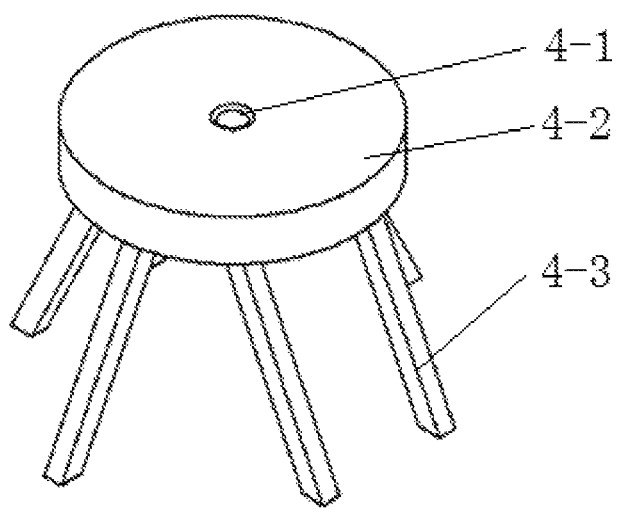
FIG. 3 is a structural view of an anti-collision fairlead base of the string-type mooring system according to the present invention.

Two anti-collision fairlead bases 4 are provided in correspondence in a vertical direction of the cables 9 below the cross arm of the support arm 8 and above the dock 12. The anti-collision fairlead bases 4 are respectively composed of legs 4-3 and a base surface 4-2. Lower ends of the legs 4-3 are fixed on the lower side of the cross arm of the support frame 8 or on the dock 12. The base surface 4-2 is provided on the top of the legs 4-3. A center of the base surface 4-2 is provided with a limiting hole 4-1 for the cable 9 to penetrate through. An upper surface of the base surface 4-2 of each anti-collision fairlead base 4 is made of an elastic material to buffer an impact of the platform arm 11 during movement. The limiting hole 4-1 in the center can limit the horizontal movement of the cable 9. The structure of the anti-collision fairlead bases 4 is shown in FIG. 3.

Figure 4:
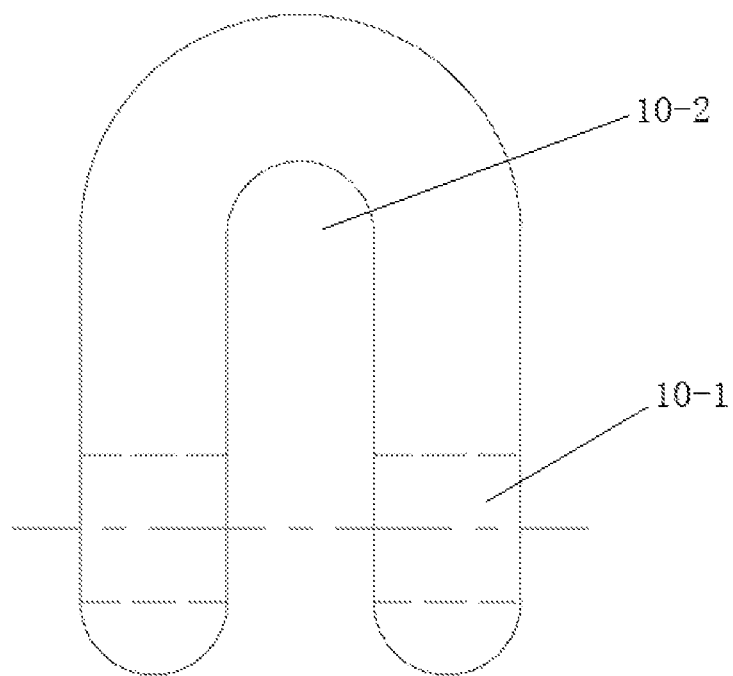
FIG. 4 is a structural view of a connection joint of the string-type mooring system according to the present invention.

The cables 9 are connected with the platform arm 11 through the connection joint 10. As shown in FIG. 4, the connection joint 10 is provided with a U-shaped groove. Connecting holes 10-1 are provided on both sides of the U-shaped groove, and holes corresponding to the connecting holes 10-1 are provided on the platform arm 11. The connection joint 10 is fixedly provided by penetrating a connecting rod through the platform arm holes and the connecting holes 10-1. The connection joint 10 is a quick detachable joint, which can quickly disconnect the platform arm 11 from the mooring system. The platform arm 11 of the platform 1 is connected to the cables 9 through the connection joint 10, and the cables 9 are respectively connected to the springs 13 in the spring sleeves 5 through two free guide rollers 3.

The string-type mooring system works as follows:

When the platform 1 is in an upright state, the position of the connection joint 10 on the platform arm 11 is an equilibrium position, which changes slowly in the vertical direction with tidal fluctuation. The mooring system controls an end position of the springs 13 in the spring sleeves 5 through the mechanical self-locking hydraulic device 6 to make the springs in a non-stretched state. Thus, the mooring device does not provide a restoring force for the platform arm 11 and the platform 1 when they are in the equilibrium position. The mechanical self-locking hydraulic devices 6 are in a self-locking state when the mooring system is not in an adjustment state.

When the platform 1 encounters external loads such as winds and waves, the platform 1, the platform arm 11 and the connection joint 10 deviate from the equilibrium position, pulling the cables 9 and the springs 13 in the spring sleeves 5 connected to the cables, thereby providing a restoring force.

The present invention is described with reference to the examples, and those skilled in the art should know that various changes or equivalent substitutions can be made to the features and examples of the present invention without departing from the spirit and scope of the present invention. In addition, under the concept of the present invention, these features and examples can be modified to adapt to specific conditions and materials without departing from the spirit and scope of the present invention. Therefore, the present invention is not limited by the disclosed specific examples, and all examples falling within the scope of the claims of this application should belong to the protection scope of the present invention.

What is claimed is:

1. A string-type mooring system, wherein a support frame (8) is provided on a dock (12); two free guide rollers (3) are provided at vertical corresponding positions that are respectively below a cross arm of the support frame (8) and above the dock (12); the two free guide rollers (3) are respectively wound with a cable (9); one end of each cable (9) is connected to a platform arm (11) fixed on a platform (1), and the other end thereof is horizontally connected with one end of a spring (13); the other end of the spring (13) is connected with a hydraulic device (6).

2. The string-type mooring system according to claim 1, wherein the springs (13) are respectively provided in a spring sleeve (5); the spring sleeves (5) and the hydraulic devices (6) are respectively provided on a lower side of the cross arm of the support frame (8) and on the dock (12) through a support base (7).

3. The string-type mooring system according to claim 1, wherein two anti-collision fairlead bases (4) are provided in correspondence in a vertical direction of the cables (9) below the cross arm of the support arm (8) and above the dock (12); the anti-collision fairlead bases (4) are respectively composed of legs (4-3) and a base surface (4-2); lower ends of the legs (4-3) are fixed on the cross arm of the support frame (8) or on the dock (12); the base surface (4-2) is provided on the top of the legs (4-3); a center of the base surface (4-2) is provided with a limiting hole (4-1) for the cable (9) to penetrate through; an upper surface of the base surface (4-2) is made of an elastic material.

4. The string-type mooring system according to claim 1, wherein roller supports (3-3) of the free guide rollers (3) are respectively provided on the lower side of the cross arm of the support frame (8) and on the dock (12); a roller is provided on an upper part of the roller support (3-3); the roller is provided with a roller groove (3-1) for winding the cable (9); an anti jumping baffle (3-2) is provided on the upper part of the roller support (3-3) on an outer side of the roller; a groove corresponding to the roller groove (3-1) is provided on an inner side of the anti-jumping baffle (3-2).

5. The string-type mooring system according to claim 1, wherein the cables (9) are connected with the platform arm (11) through a connection joint (10); the connection joint (10) is provided with a U-shaped groove; connecting holes (10-1) are provided on both sides of the U-shaped groove, and holes corresponding to the connecting holes (10-1) are provided on the platform arm (11); the connection joint (10) is fixedly provided by penetrating a connecting rod through the platform arm holes and the connecting holes (10-1).

6. The string-type mooring system according to claim 1, wherein fenders (2) are provided between a side of the dock (12) and the platform (1).

7. The string-type mooring system according to claim 1, wherein the hydraulic devices (6) are self-locking hydraulic devices.

\* \* \* \* \*